No. 634,828. Patented Oct. 10, 1899.
L. E. MILLER.
COMBINED PORTABLE WATER CART AND WATERING TROUGH.
(Application filed May 13, 1899.)

(No Model.)

Witnesses
G. H. Walmsley.
Thomas Powell

Inventor,
Lewis E. Miller,
By Davis & Davis,
Attorneys.

UNITED STATES PATENT OFFICE.

LEWIS E. MILLER, OF OTTUMWA, IOWA.

COMBINED PORTABLE WATER-CART AND WATERING-TROUGH.

SPECIFICATION forming part of Letters Patent No. 634,828, dated October 10, 1899.

Application filed May 13, 1899. Serial No. 716,730. (No model.)

*To all whom it may concern:*

Be it known that I, LEWIS E. MILLER, a citizen of the United States, and a resident of Ottumwa, county of Wapello, State of Iowa, have invented certain new and useful Improvements in a Combined Portable Water-Cart and Watering-Trough, of which the following is a specification, reference being had therein to the accompanying drawings, in which—

Figure 1:
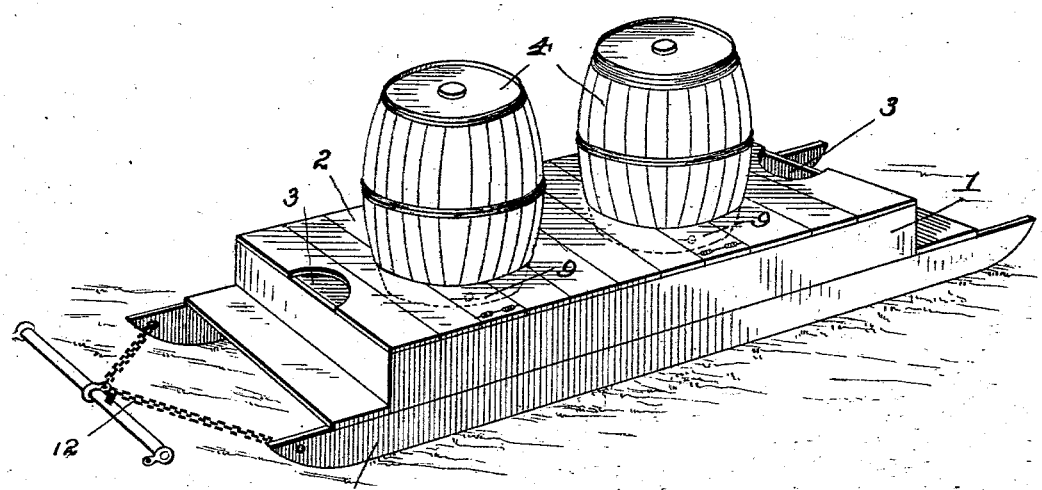
Figure 2:
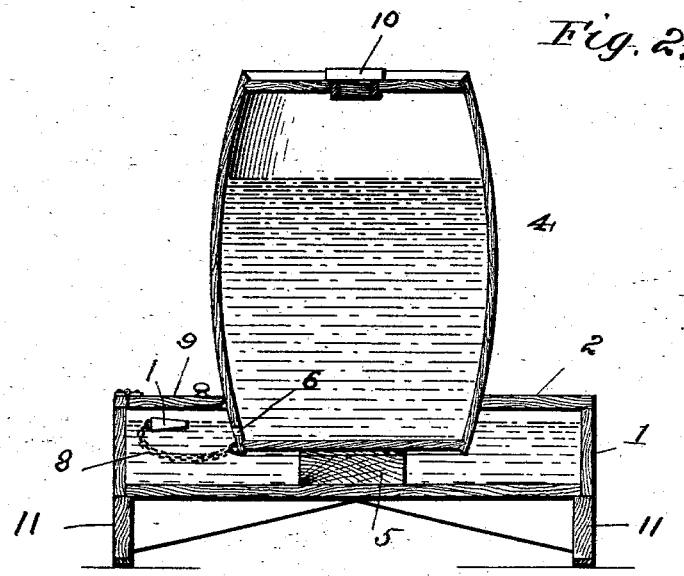

Figure 1 is a perspective view of the tank, and Fig. 2 is a vertical cross-sectional view thereof.

The object of the invention is to produce a combined water-cart and stock-watering trough which may be readily transported from place to place and which when in use as a watering-trough will automatically feed the water from a storage-reservoir to the drinking-trough and in which when in use as a water-cart the water will be contained in the reservoirs and will not enter the drinking-trough.

Referring to the various parts by numerals, 1 designates the water-trough, which is of any suitable depth and is provided with a tight top 2, drinking-openings 3 being formed in this top at suitable points. Fitting closely in openings in the top 2 are two water-tanks 4, whose lower ends enter the trough and rest upon a longitudinal beam 5, secured to the bottom thereof. In the side of each reservoir, near the bottom thereof and an inch or two from the top of the tank, is formed a small water-outlet 6, which when required may be closed by means of a plug 7, secured to the tank by means of a suitable cord or chain 8. This plug is preferably kept within the tank 1, and to give ready access thereto when it is desired to insert it in the opening 6 a hinged cover 9 is formed in the top of the tank adjacent each reservoir. In the top of each tank or at a suitable point near the top is formed a filling-opening, which is closed air-tight by means of a screw-plug 10 or other suitable device.

To provide for transporting the tank or trough from place to place, it is mounted upon suitable sled-runners 11, and to the forward end of these is attached a suitable draft connection 12, to which the draft-animal may be hitched.

When it is desired to fill the reservoirs or tanks, the plugs 7 are inserted in the openings 6 and the screw-caps 10 are removed. When it is desired to permit water to flow from the reservoirs into the trough, the caps 10 are first screwed tightly into place, so as to form air-tight closures. The plugs 7 are then removed, whereupon water flows through openings 6 into the tank until the level of the water therein is just above the openings 6, when the rising water cuts off the access of air to the interior of the reservoirs, and thereby prevents the further escape of water from the reservoir. As the water is removed from the trough additional water automatically flows into the same from the reservoirs. The reservoirs are raised sufficiently by the bar 5 to permit the outlets 6 to be formed in the sides of the reservoirs near the bottoms and yet be only an inch or two below the top of the tank 1. This is to insure the water rising to near the top of the tank and also to permit practically all the water leaving the reservoirs, so that the tank may be entirely refilled with fresh water before the trough becomes dry. If the bottoms of the tanks were on a level with the bottom of the trough, there would always be more or less stale water in the tank unless the trough be perfectly dry. It will also be noted that by this arrangement the tanks may be more readily washed, the cleansing-water being all permitted to flow out into the trough. The tight cover 2 protects the water in the tank from the sun and prevents dust from settling in it, except of course such as may enter through the openings 3, and keeps the water cool and clean. By means of the sled the tank may be readily moved about either to fill the reservoirs, to transport water from place to place, or to water stock in different fields. It is of course evident that, if desired, only one reservoir need be used and also that as many drink-openings may be employed as desired. By means of the filling-opening at the top and closure device 7 the water in the reservoirs may be prevented from entering the tank 1, as is evident. Because of this the apparatus may be readily transported while the reservoirs are full of water without splashing the water out. It will also be noted that by my arrangement the tanks may be filled as often as desired without inverting or otherwise disturbing them and without automatic valves, which soon become inoperative.

Any suitable transporting means may be employed to carry the tank 1 and any suitable means may be employed to close the water-outlet 6.

I claim—

In a combined portable water-cart and stock-trough, the combination of a closed trough provided with a drink-opening in its top, transporting means therefor, a tank having its lower end fitted in an opening in the top of the tank, whereby said top or cover braces the tank, said tank having an opening in its top closed by an air-tight removable device and an outlet at its bottom at a point within the trough and below the normal water-level thereof, a removable closure for this outlet, and a support within the trough to bring the bottom of the tank up from the bottom of the trough and near to but below the normal water-level of the trough, substantially as and for the purpose set forth.

In testimony whereof I hereunto affix my signature, in the presence of two witnesses, this 8th day of May, 1899.

LEWIS E. MILLER.

Witnesses:
J. DON. KISER,
JAMES J. SMITH.